United States Patent
Dry et al.

(10) Patent No.: US 9,688,174 B2
(45) Date of Patent: Jun. 27, 2017

(54) MULTI-CELL SEAT CUSHION ASSEMBLY

(71) Applicant: Ford Global Technologies, LLC, Dearborn, MI (US)

(72) Inventors: Alan George Dry, Grosse Pointe Woods, MI (US); Joseph S. Talamonti, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/820,883

(22) Filed: Aug. 7, 2015

(65) Prior Publication Data
US 2017/0036574 A1     Feb. 9, 2017

(51) Int. Cl.
| B60N 2/58 | (2006.01) |
| B60N 2/56 | (2006.01) |
| B60N 2/64 | (2006.01) |
| B60N 2/70 | (2006.01) |

(52) U.S. Cl.
CPC ........... B60N 2/5621 (2013.01); B60N 2/58 (2013.01); B60N 2/5816 (2013.01); B60N 2/646 (2013.01); B60N 2/7082 (2013.01)

(58) Field of Classification Search
CPC .... B60N 2/4415; B60N 2/7082; A47C 7/446; A47C 7/467
See application file for complete search history.

(56) References Cited

U.S. PATENT DOCUMENTS

| 2,958,369 A | 11/1960 | Pitts et al. |
| 3,330,598 A | 7/1967 | Whiteside |
| 3,363,941 A * | 1/1968 | Wierwille ................ A47C 4/54 297/284.3 |
| 3,403,938 A | 10/1968 | Cramer et al. |
| 3,915,421 A | 10/1975 | Le Forestier |
| 3,929,374 A | 12/1975 | Hogan et al. |
| 4,324,431 A | 4/1982 | Murphy et al. |
| 4,334,709 A | 6/1982 | Akiyama et al. |
| 4,353,595 A | 10/1982 | Kaneko et al. |

(Continued)

FOREIGN PATENT DOCUMENTS

| DE | 3119867 A1 | 12/1982 |
| DE | 3735428 A1 | 5/1989 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Philip Gabler
(74) *Attorney, Agent, or Firm* — Vichit Chea; Price Heneveld LLP

(57) ABSTRACT

A vehicle seating assembly is provided that includes a seatback and a support layer coupled to a seat frame. The support layer includes a plurality of sealed support cells and defines a plurality of attachment points. The support cells have a first air pressure and a comfort layer positioned over the support layer. The comfort layer includes a plurality of sealed comfort cells having a second air pressure. The support layer, comfort layer, and cover stock are secured to the seat frame via the attachment points.

20 Claims, 14 Drawing Sheets

(56) References Cited

U.S. PATENT DOCUMENTS

| | | |
|---|---|---|
| 4,541,669 A | 9/1985 | Goldner |
| 4,629,248 A | 12/1986 | Mawbey |
| 4,720,141 A | 1/1988 | Sakamoto et al. |
| 4,915,447 A | 4/1990 | Shovar |
| 5,020,852 A | 6/1991 | Marion |
| 5,082,326 A | 1/1992 | Sekido et al. |
| 5,171,062 A | 12/1992 | Courtois |
| 5,174,526 A | 12/1992 | Kanigowski |
| 5,190,348 A | 3/1993 | Colasanti |
| 5,243,722 A | 9/1993 | Gusakov |
| 5,263,765 A | 11/1993 | Nagashima et al. |
| 5,318,344 A | 6/1994 | Wang |
| 5,518,294 A | 5/1996 | Ligon, Sr. et al. |
| 5,560,681 A | 10/1996 | Dixon et al. |
| 5,638,565 A * | 6/1997 | Pekar .............. A47C 4/54 5/653 |
| 5,647,635 A | 7/1997 | Aumond et al. |
| 5,658,050 A * | 8/1997 | Lorbiecki ........ B60N 2/4415 137/625.44 |
| 5,708,999 A * | 1/1998 | Priolo ............... A47C 27/081 5/644 |
| 5,755,493 A | 5/1998 | Kodaverdian |
| 5,769,489 A | 6/1998 | Dellanno |
| 5,826,938 A | 10/1998 | Yanase et al. |
| 5,836,648 A | 11/1998 | Karschin et al. |
| 5,860,699 A | 1/1999 | Weeks |
| 5,902,014 A | 5/1999 | Dinkel et al. |
| 5,913,568 A | 6/1999 | Brightbill et al. |
| 5,951,039 A | 9/1999 | Severinski et al. |
| 6,024,406 A | 2/2000 | Charras et al. |
| 6,062,642 A | 5/2000 | Sinnhuber et al. |
| 6,145,925 A | 11/2000 | Eksin et al. |
| 6,155,593 A | 12/2000 | Kimura et al. |
| 6,179,379 B1 | 1/2001 | Andersson |
| 6,189,168 B1 * | 2/2001 | Graebe ............. A47G 9/1027 5/490 |
| 6,189,966 B1 | 2/2001 | Faust et al. |
| 6,196,627 B1 | 3/2001 | Faust et al. |
| 6,203,105 B1 | 3/2001 | Rhodes, Jr. |
| 6,206,466 B1 | 3/2001 | Komatsu |
| 6,206,474 B1 * | 3/2001 | Kruse ............... B60N 2/70 297/284.3 |
| 6,217,062 B1 | 4/2001 | Breyvogel et al. |
| 6,220,661 B1 | 4/2001 | Peterson |
| 6,224,150 B1 | 5/2001 | Eksin et al. |
| 6,296,308 B1 | 10/2001 | Cosentino et al. |
| 6,312,050 B1 | 11/2001 | Eklind |
| 6,364,414 B1 | 4/2002 | Specht |
| 6,375,269 B1 | 4/2002 | Maeda et al. |
| 6,394,546 B1 | 5/2002 | Knoblock et al. |
| 6,454,353 B1 | 9/2002 | Knaus |
| 6,523,892 B1 | 2/2003 | Kage et al. |
| 6,547,327 B1 * | 4/2003 | Yates ............... B62J 1/22 297/200 |
| 6,550,856 B1 | 4/2003 | Ganser et al. |
| 6,565,150 B2 | 5/2003 | Fischer et al. |
| 6,619,605 B2 | 9/2003 | Lambert |
| 6,623,080 B2 * | 9/2003 | Clapper ............ A47C 4/54 297/452.41 |
| 6,682,140 B2 | 1/2004 | Minuth et al. |
| 6,695,406 B2 | 2/2004 | Plant |
| 6,698,832 B2 | 3/2004 | Boudinot |
| 6,736,452 B2 | 5/2004 | Aoki et al. |
| 6,758,522 B2 | 7/2004 | Ligon, Sr. et al. |
| 6,808,230 B2 | 10/2004 | Buss et al. |
| 6,824,212 B2 | 11/2004 | Malsch et al. |
| 6,848,742 B1 | 2/2005 | Aoki et al. |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,997,473 B2 | 2/2006 | Tanase et al. |
| 7,040,699 B2 | 5/2006 | Curran et al. |
| 7,055,199 B2 * | 6/2006 | Thompson ........ A47C 7/467 5/626 |
| 7,100,992 B2 | 9/2006 | Bargheer et al. |
| 7,131,694 B1 | 11/2006 | Buffa |
| 7,159,934 B2 | 1/2007 | Farquhar et al. |
| 7,185,950 B2 | 3/2007 | Pettersson et al. |
| 7,213,876 B2 | 5/2007 | Stoewe |
| 7,229,118 B2 | 6/2007 | Saberan et al. |
| 7,261,371 B2 | 8/2007 | Thunissen et al. |
| 7,322,651 B2 | 1/2008 | Makhsous et al. |
| 7,344,189 B2 | 3/2008 | Reed et al. |
| 7,350,851 B2 * | 4/2008 | Barvosa-Carter .. B60N 2/42709 296/187.02 |
| 7,350,859 B2 | 4/2008 | Klukowski |
| 7,393,005 B2 | 7/2008 | Inazu et al. |
| 7,425,034 B2 | 9/2008 | Bajic et al. |
| 7,441,838 B2 | 10/2008 | Patwardhan |
| 7,467,823 B2 | 12/2008 | Hartwich |
| 7,478,869 B2 | 1/2009 | Lazanja et al. |
| 7,481,489 B2 | 1/2009 | Demick |
| 7,506,924 B2 | 3/2009 | Bargheer et al. |
| 7,506,938 B2 | 3/2009 | Brennan et al. |
| 7,530,633 B2 | 5/2009 | Yokota et al. |
| 7,543,888 B2 | 6/2009 | Kuno |
| 7,578,552 B2 | 8/2009 | Bajic et al. |
| 7,597,398 B2 | 10/2009 | Lindsay |
| 7,614,693 B2 | 11/2009 | Ito |
| 7,641,281 B2 | 1/2010 | Grimm |
| 7,669,925 B2 | 3/2010 | Beck et al. |
| 7,669,928 B2 | 3/2010 | Snyder |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,602 B2 | 8/2010 | Lazanja et al. |
| 7,784,863 B2 | 8/2010 | Fallen |
| 7,802,843 B2 | 9/2010 | Andersson et al. |
| 7,819,470 B2 | 10/2010 | Humer et al. |
| 7,823,971 B2 | 11/2010 | Humer et al. |
| 7,845,729 B2 | 12/2010 | Yamada et al. |
| 7,857,381 B2 | 12/2010 | Humer et al. |
| 7,871,126 B2 | 1/2011 | Becker et al. |
| 7,891,701 B2 | 2/2011 | Tracht et al. |
| 7,909,360 B2 | 3/2011 | Marriott et al. |
| 7,931,294 B2 | 4/2011 | Okada et al. |
| 7,931,330 B2 | 4/2011 | Itou et al. |
| 7,946,649 B2 | 5/2011 | Galbreath et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,075,053 B2 | 12/2011 | Tracht et al. |
| 8,109,569 B2 | 2/2012 | Mitchell |
| 8,123,246 B2 | 2/2012 | Gilbert et al. |
| 8,128,167 B2 | 3/2012 | Zhong et al. |
| 8,162,391 B2 | 4/2012 | Lazanja et al. |
| 8,162,397 B2 | 4/2012 | Booth et al. |
| 8,167,370 B2 | 5/2012 | Arakawa et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,165 B2 | 7/2012 | Mizoi |
| 8,342,607 B2 | 1/2013 | Hofmann et al. |
| 8,794,707 B2 | 8/2014 | Bocsanyi et al. |
| 8,827,371 B2 | 9/2014 | Brncick et al. |
| 2004/0195870 A1 | 10/2004 | Bohlender et al. |
| 2005/0200166 A1 | 9/2005 | Noh |
| 2006/0043777 A1 | 3/2006 | Friedman et al. |

(56) References Cited

U.S. PATENT DOCUMENTS

| | | |
|---|---|---|
| 2007/0120401 A1 | 5/2007 | Minuth et al. |
| 2008/0174159 A1 | 7/2008 | Kojima et al. |
| 2009/0066122 A1 | 3/2009 | Minuth et al. |
| 2009/0165263 A1 | 7/2009 | Smith |
| 2009/0322124 A1 | 12/2009 | Barkow et al. |
| 2010/0038937 A1 | 2/2010 | Andersson et al. |
| 2010/0117414 A1 | 5/2010 | Hwang et al. |
| 2010/0140986 A1 | 6/2010 | Sawada |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0207443 A1 | 8/2010 | Brncick |
| 2010/0231013 A1 | 9/2010 | Schlenker |
| 2010/0270840 A1 | 10/2010 | Tanaka et al. |
| 2010/0301650 A1 | 12/2010 | Hong |
| 2010/0320816 A1 | 12/2010 | Michalak |
| 2011/0018498 A1 | 1/2011 | Soar |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |

FOREIGN PATENT DOCUMENTS

| | | |
|---|---|---|
| EP | 0754590 | 1/1997 |
| EP | 0926969 | 1/2002 |
| EP | 1266794 | 3/2004 |
| EP | 1123834 | 10/2004 |
| EP | 1050429 | 10/2005 |
| EP | 1084901 | 6/2006 |
| EP | 1674333 A1 | 6/2006 |
| EP | 1674333 | 8/2007 |
| EP | 1950085 | 12/2008 |
| EP | 1329356 | 11/2009 |
| JP | 201178557 A | 4/2011 |
| WO | WO9511818 | 5/1995 |
| WO | 9831992 A1 | 7/1998 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

"Thigh Support For Tall Drivers," http://cars.about.com/od/infiniti/ig/2009-Infiniti-G37-Coupe-pics/2008-G37-cpe-thigh-support.htm (1 page).

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

ecoustics.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

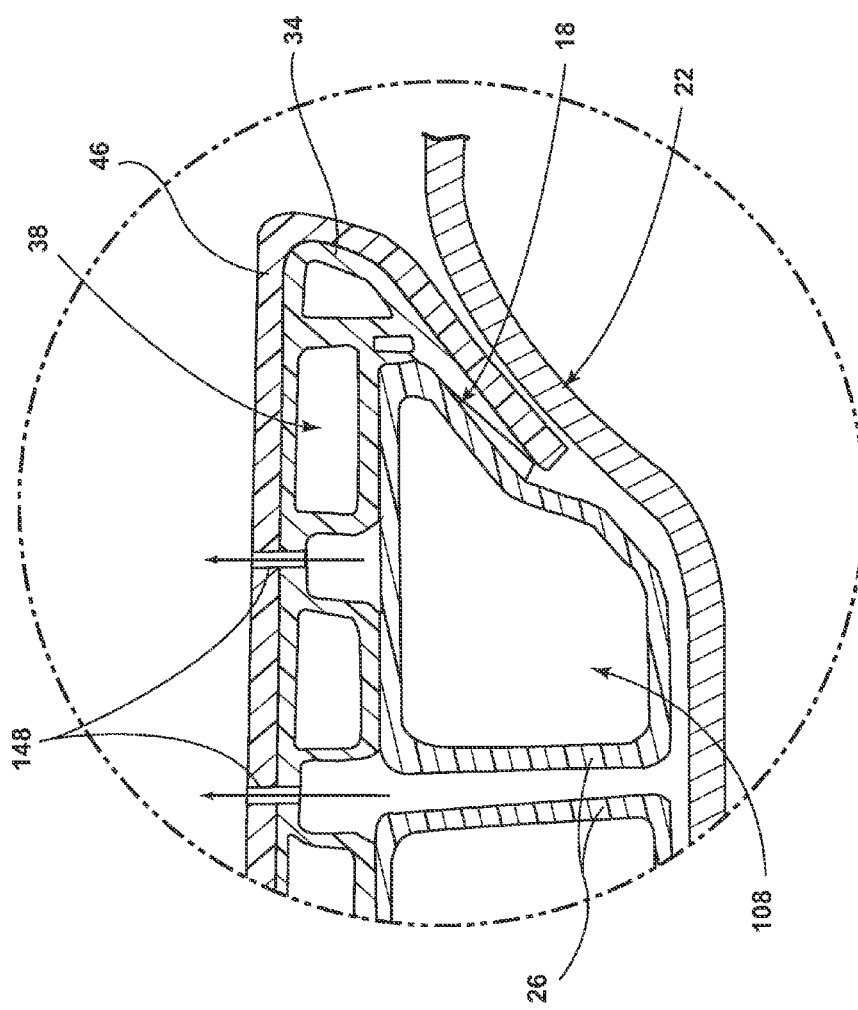

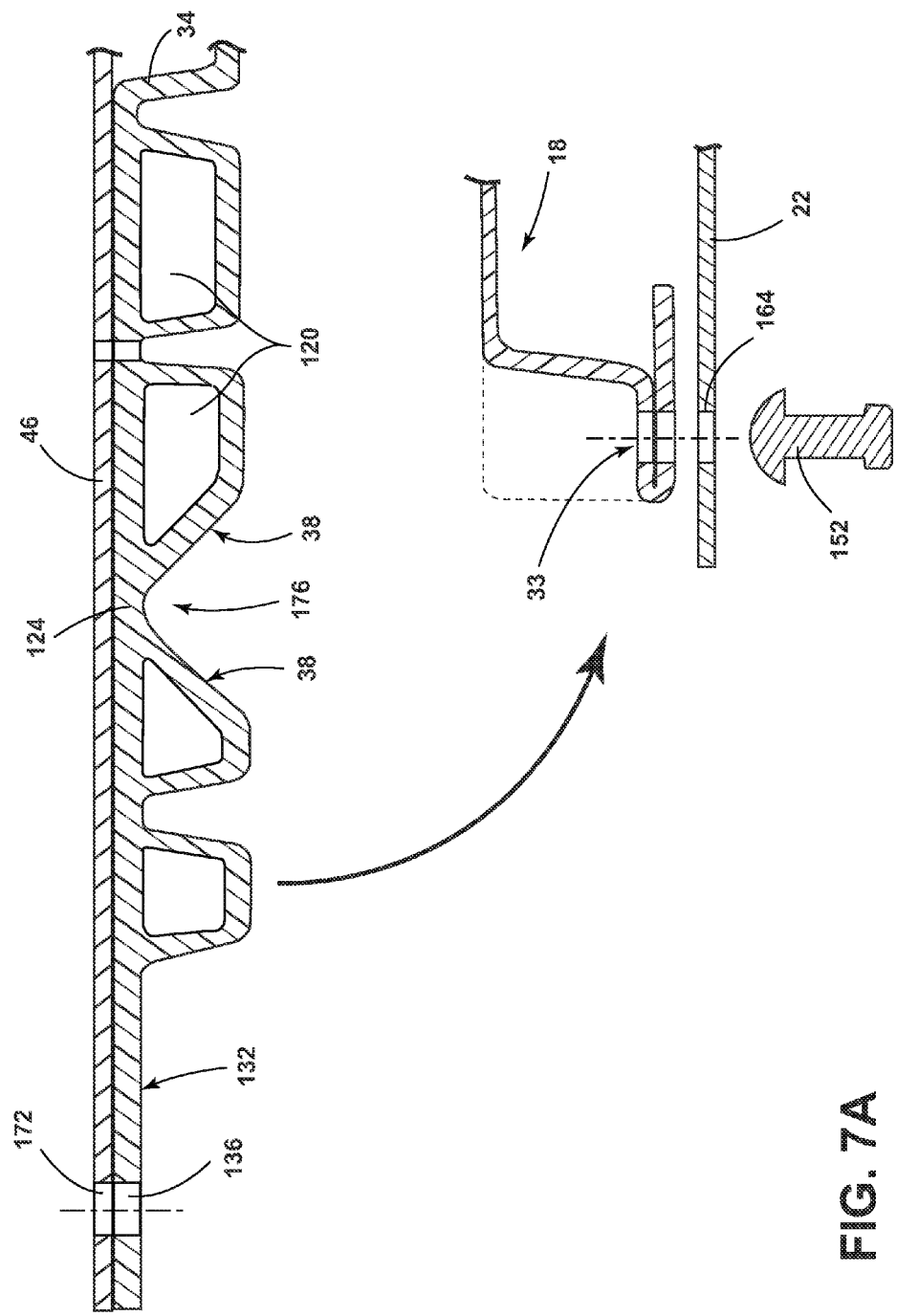

MULTI-CELL SEAT CUSHION ASSEMBLY

FIELD OF THE INVENTION

The present disclosure generally relates to vehicle seating systems, and more specifically, vehicle seat seating systems having multi-cell cushion assemblies.

BACKGROUND OF THE INVENTION

Vehicle seating typically includes foam cushions and/or an inner spring system. Seating foam and spring systems may add weight to a vehicle, thereby decreasing its fuel efficiency. Additionally, foam and spring systems may lose resiliency over time. Further, the foam and spring system may be costly to produce.

SUMMARY OF THE DISCLOSURE

According to one aspect of the present disclosure, a vehicle seating assembly is provided that includes a seatback and a support layer coupled to a seat frame. The support layer includes a plurality of sealed support cells defining a plurality of attachment points. The support cells have a first air pressure and a comfort layer positioned over the support layer. The comfort layer includes a plurality of sealed comfort cells having a second air pressure. The support layer, comfort layer, and cover stock are secured to the seat frame via the attachment points.

According to another aspect of the present disclosure, a seating assembly is provided that includes a seatback and a support layer coupled to a seat frame. The support layer includes a plurality of support cells. The support cells have a first air pressure. A comfort layer is positioned on top of the support layer. The comfort layer includes a plurality of comfort cells having a second air pressure. The first air pressure is greater than the second air pressure.

According to yet another aspect of the present disclosure, a vehicle cushion assembly is provided that includes a support layer coupled to a seat frame that has a sealed support cell. The support layer defines a ventilation slot. A comfort layer is positioned on top of the support layer with the comfort layer having a sealed comfort cell. The comfort layer defines a ventilation aperture. The ventilation slot and the ventilation aperture are in fluid communication with a cover stock positioned on top of the comfort layer.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5C is an enlarged cross-sectional view of the seating assembly of FIG. 5A taken at VC, according to one embodiment;

FIG. 7A is an exploded cross-sectional view taken at VB of FIG. 5A, according to one embodiment;

DETAILED DESCRIPTION OF THE EMBODIMENTS

Figure 1:
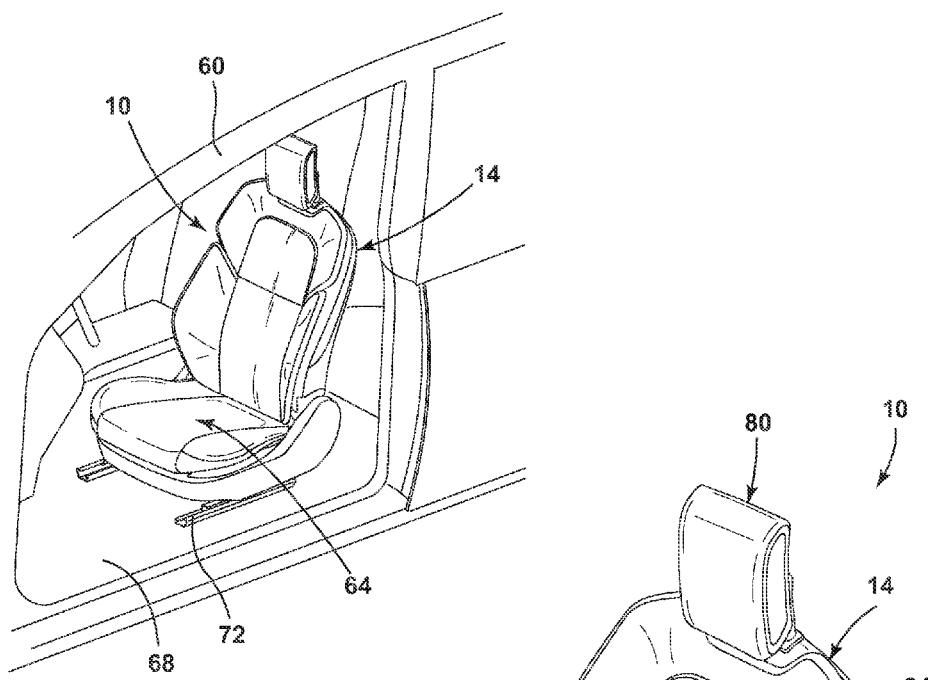
FIG. 1 is a top perspective view of one embodiment of a seating assembly within a vehicle.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-9, reference numeral 10 generally designates a vehicle seating assembly that includes a seatback 14, a support layer 18 positioned on a seat frame 22. The support layer 18 includes a plurality of sealed support cells 26. The support layer 18 defines a plurality of attachment points 30. The support cells 26 have a first air pressure. A comfort layer 34 is positioned on top of the support layer 18. The comfort layer 34 includes a plurality of sealed comfort cells 38 having a second air pressure. A cover stock 46 is positioned over the comfort layer 34. The support layer 18, the comfort layer 34, and the cover stock 46 are secured to the seat frame 22 via the attachment points 30. The support layer 18, comfort layer 34, and cover stock 46, in assembly, define a cushion assembly 50.

Referring now to FIG. 1, the vehicle seating assembly 10 is depicted as positioned in a driver side location of a vehicle 60. The vehicle seating assembly 10 includes a seat bottom 64 that is pivotally coupled with the seatback 14 for pivotally adjusting the seatback 14 between upright and reclined positions relative to the seat bottom 64. The seat bottom 64 is slidably coupled with a floor 68 of the vehicle 60 upon a track assembly 72. It will be understood that the vehicle seating assembly 10 may be positioned in various positions throughout the vehicle 60 other than the illustrated location, such as a passenger side location, a mid-row location, and a rear seat location. It will also be understood that the vehicle seating assembly 10 may be a bench seat (e.g., for a rear seat location of the vehicle 60) and may not include the track assembly 72, such that the vehicle seating assembly 10 may be fixedly or alternatively coupled with the floor 68 of the vehicle 60. In such a rear seat embodiment, the floor 68 may rise up to define a surface to which the seat bottom 64 and/or the seatback 14 is coupled.

Figure 2:
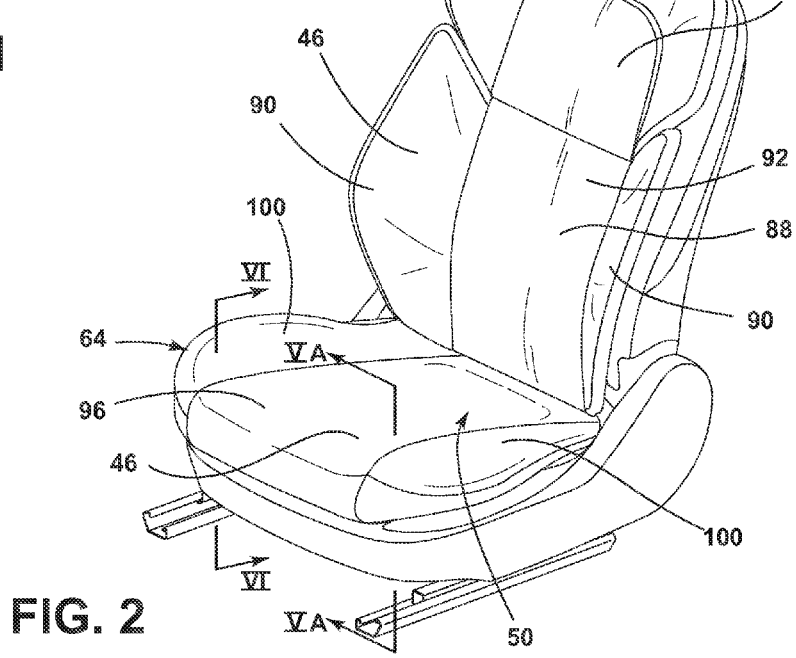
FIG. 2 is a top perspective view of the seating assembly.

Referring now to the depicted embodiment of FIG. 2, the seatback 14 is pivotally coupled with a rear portion of the seat bottom 64. A headrest 80 is coupled with and supported at an upper portion of the seatback 14. The seatback 14 includes an upper support component 84 and a lower support component 88 for supporting an occupant's upper and lower back, respectively. The upper support component 84 may be configured to pivot forward relative to the seatback 14 and the lower support component 88 statically couples with the seatback 14. It is also contemplated that the upper and lower support components 84, 88 of the seatback 14 may be a single integral component. Further, it is conceivable that the headrest 80 may be integrated with the upper support component 84 or that the headrest 80 may otherwise not be included on the vehicle seating assembly 10. Each of the upper support component 84 and the lower support component 88 may define back bolsters 90 spaced around a central region 92 and configured to contact an occupant of the seating assembly 10 proximate the occupant's mid-section to help secure the occupant within the seating assembly 10.

The seat bottom 64 includes both a central portion 96 and side bolsters 100. The central portion 96 of the seat bottom 64 is configured to primarily support the weight of an occupant of the seating assembly 10, while the side bolsters 100 are configured to help center the occupant within the seat bottom 64 of the seating assembly 10. Disposed over both the seat bottom 64 and the seatback 14 is the cover stock 46 which defines a support surface of the vehicle seating assembly 10. The cover stock 46 may conceivably include a fabric material, a leather material, a vinyl material, a composite material, or other upholstery materials generally known in the art. The cover stock 46 may be a single unitary piece which extends over both the seatback 14 and the seat bottom 64, or may separately cover the seatback 14 and the seat bottom 64.

Figure 3A:
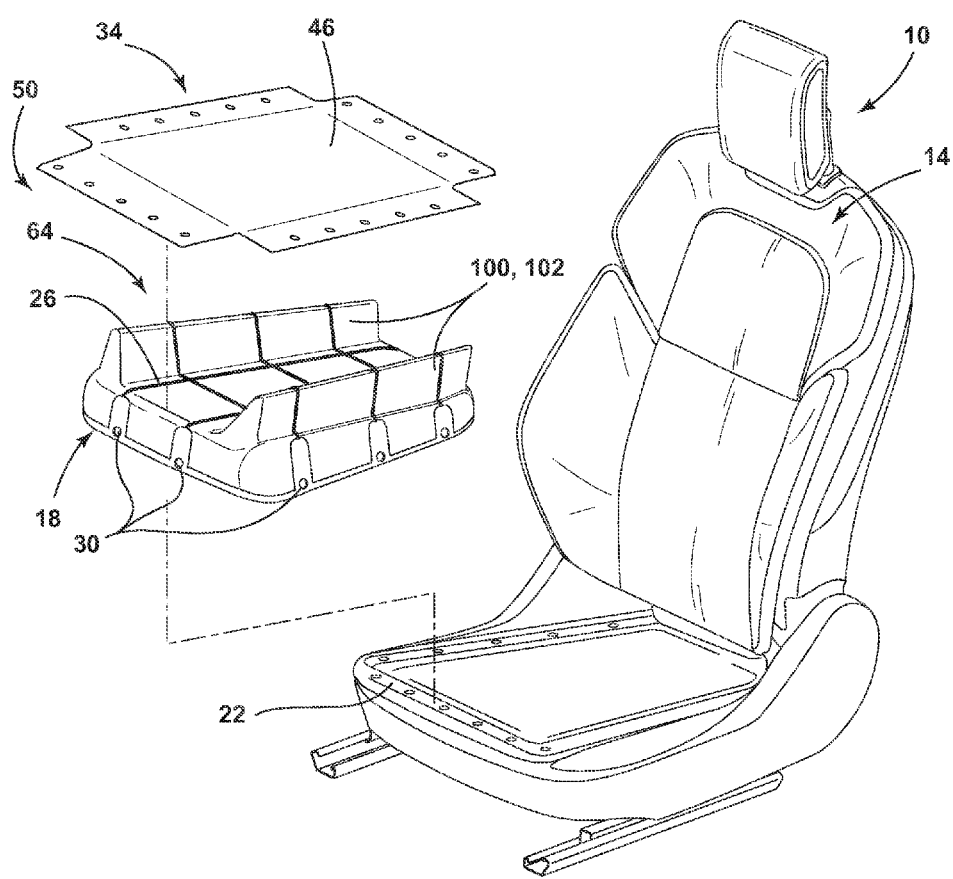
FIG. 3A is a top perspective view of the seating assembly having an exploded cushion assembly.
Figure 3B:
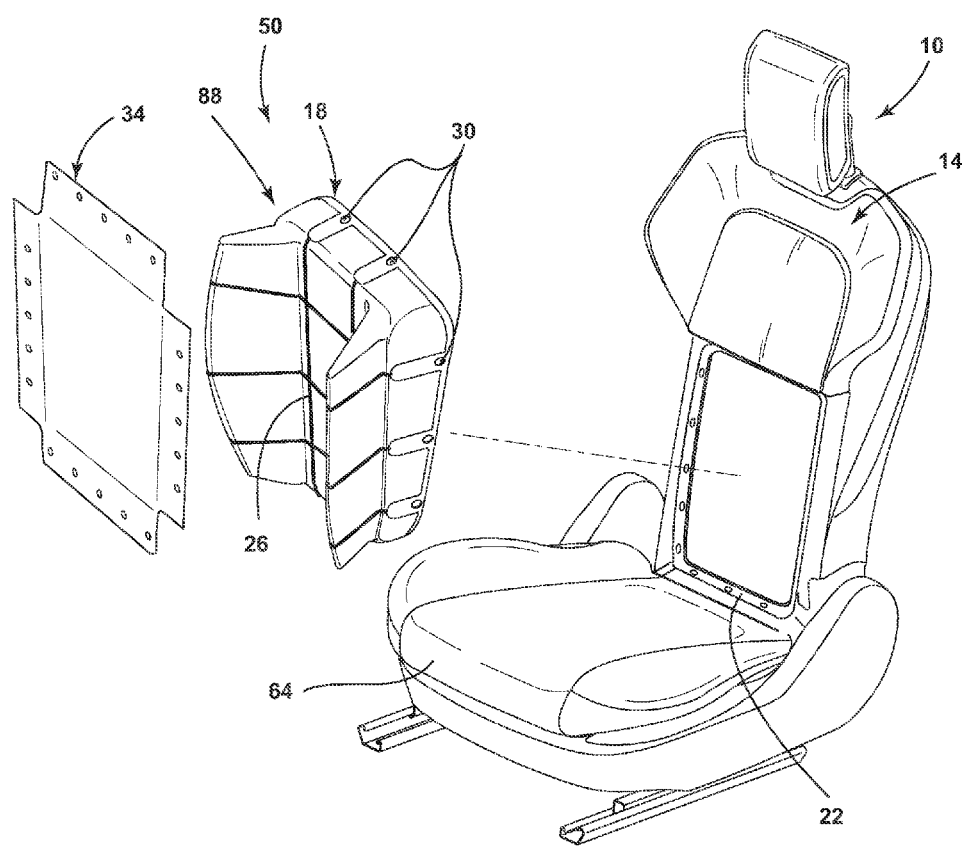
FIG. 3B is a top perspective view of the seating assembly having an exploded cushion assembly.

Referring now to the depicted embodiments of FIGS. 3A and 3B, the cushion assembly 50 may be positioned within the seat bottom 64 and/or the seatback 14. In embodiments where the cushion assembly 50 is located within the seat bottom 64, the cushion assembly 50 may be attached to either the seat frame 22 and/or a seat pan of the seating assembly 10. In embodiments incorporating the cushion assembly 50 in the seatback 14, the cushion assembly 50 may be attached to the seat frame 22. The cushion assembly 50 may extend through the upper support component 84 and/or the lower support component 88.

Referring now to FIG. 3A, the seat bottom 64 is depicted as including the comfort layer 34 and the support layer 18 of the cushion assembly 50 coupled to the seat frame 22. The support layer 18 is configured to primarily support the weight of the occupant of the seating assembly 10. The support layer 18 is depicted as defining bolster cells 102 which provide structure to the side bolsters 100, but, in alternate embodiments, the bolster cells 102 may be defined by the comfort layer 34 or may be separate components. The comfort layer 34 is positioned on top of the support layer 18. The bolster cells 102 are defined on the sides of the support layer 18 such that in assembly, the side bolsters 100 rise up along the sides of the seat bottom 64. The cover stock 46 may be bonded (e.g., via adhesively, lamination, thermally, mechanically, or chemically) to the comfort layer 34. For example, the comfort layer 34 may be formed directly to the cover stock 46 during the manufacturing of the comfort layer 34.

Referring now to FIG. 3B, the lower support component 88 is depicted as including the cushion assembly 50. In such an embodiment, the comfort layer 34 and the support layer 18 of the cushion assembly 50 are coupled to the seat frame 22. The support layer 18 is configured to support the weight of the occupant as they lean back into the seating assembly 10. As explained above, the bolster cells 102 are defined by the support layer 18, but may be defined by the comfort layer 34, or may be separate components. In embodiments where the cushion assembly 50 is employed in the seatback 14 of the seating assembly 10, the bolster cells 102 may form the structure of the back bolsters 90. The comfort layer 34 is positioned on top of the support layer 18. The positioning of the bolsters cells 102 allows the back bolsters 90 to rise up along the sides of the comfort cells 38 to make contact with the mid-section of the occupant.

Figure 4A:
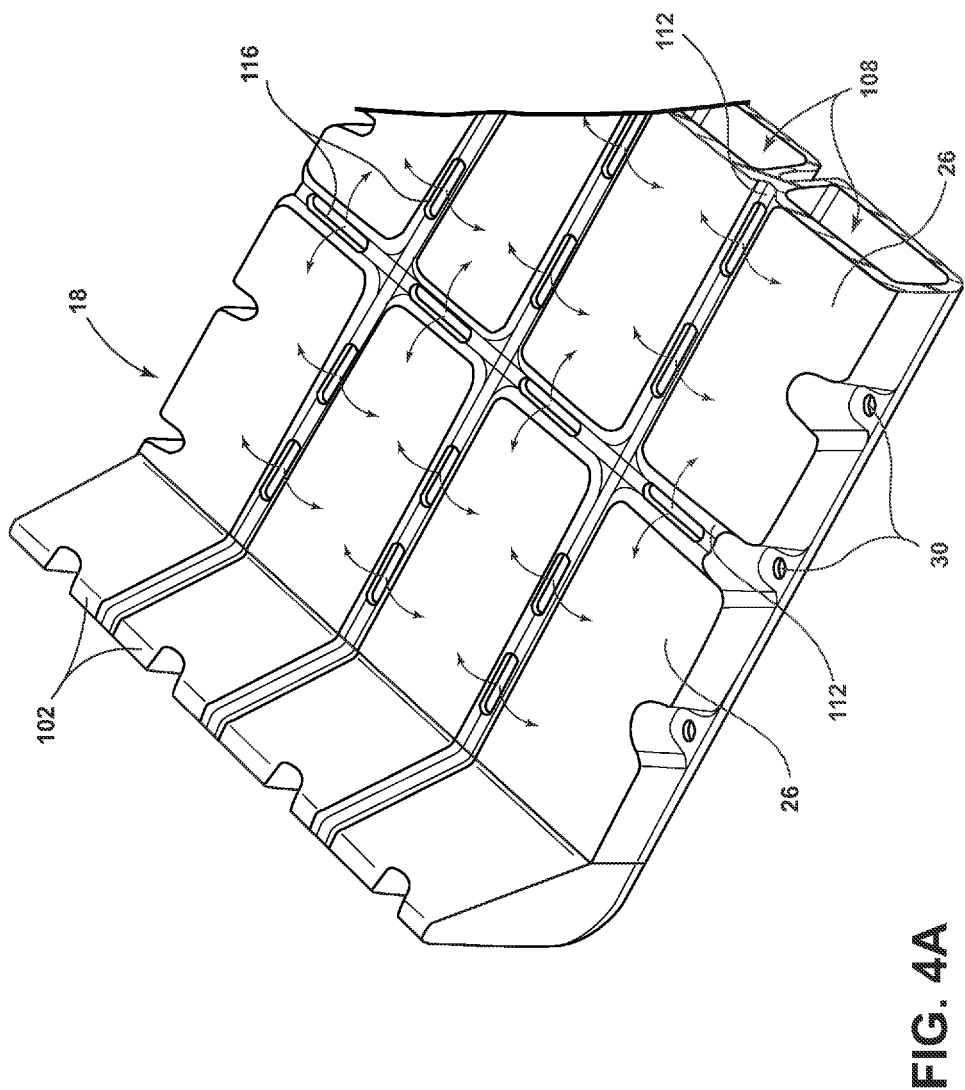
FIG. 4A is an enlarged top perspective view of a support layer of the cushion assembly of FIG. 3A according to one embodiment.

Referring now to FIG. 4A, depicted is the support layer 18 of the cushion assembly 50. The support layer 18 defines the plurality of support cells 26. The support layer 18 may be composed of a resilient thermoplastic which rebounds to approximately its original shape after compression and/or stretching. Exemplary resilient thermoplastics may come from classes such as styrenics, copolyesters, polyurethanes, polyamides, polyolefin blends, polyolefin plastomers, and combinations thereof. Specific examples of a resilient thermoplastic may include polyolefin elastomers, neoprene, spandex, latex, polyisoprene, styrene-butadiene copolymer, acrylonitrile butadiene, rubber, choloroprene, polysiloxane, and combinations thereof. Although the support cells 26 are depicted in a grid pattern or arrangement, the arrangement of the support cells may take a variety of configurations, including a random configuration or an alternating non-grid pattern.

The support cells 26 are depicted as substantially rectangular in shape, but may take a variety of shapes, including spherical, square, triangular, oval, circular, or combinations thereof. In some embodiments, the support cells 26 may have more than one shape or each support cell 26 may have a different shape. In yet other embodiments, the support cells 26 may extend the length or width of the support layer 18. In the exemplary depicted embodiment, the support cells 26 are split into a left grouping and a right grouping. Such an embodiment may increase the transverse stability of the seat bottom 64 or seatback 14 of the vehicle seating assembly 10. In other embodiments, there may be more than two groupings (e.g., left, center, right, forward, rearward, etc.) of support cells 26 extending across the support layer 18. The support layer 18 is depicted as defining eight support cells 26, but may define between one and about fifty support cells 26, or between about four and about twenty support cells 26. Specific examples include eight, ten, twelve, and fifteen support cells 26. The support cells 26 extend up to the bolster cells 102. As depicted, the bolster cells 102 have a different shape and are larger than the support cells 26. In some embodiments, the bolster cells 102 may be combined to form a single bolster cell 102 which extends along each side of the support layer 18.

Each of the support cells 26 and the bolster cells 102 define a support cavity 108 which is sealed from each other support cavity 108 (i.e., the support cavities 108 are not interconnected). Disposed within the support cavities 108 is a fluid (e.g., liquid or gas) configured to resist an external force applied to the support cells 26 and bolster cells 102. With the support cavities 108 sealed from one another, force applied to the support cells 26 and bolster cells 102 generates a hydrostatic pressure increase within the support cavities 108 thereby allowing the support cells 26 and bolster cells 102 to resist deformation under the force. By sealing the support cavities 108, the fluid within the support cavities 108 is not transferred to other support cells 26, thus preventing swelling of other support cells 26 and providing transverse stability. In gas embodiments of the fluid, the gas may be oxygen, nitrogen, carbon dioxide, noble gases (e.g., helium, argon, etc.), other gases, gas mixtures, and combinations thereof. In an exemplary embodiment, the fluid of the support cavities 108 may be air. In some combinations, the support cavities 108 may have different fluid disposed therein (e.g., the bolster cells 102 have a different fluid than the support cells 26).

The fluid of the support cavities 108 has both a resting pressure (e.g., a first pressure) and an active pressure. The resting pressure occurs when the seating assembly 10 is unoccupied or no force is otherwise acting on the support layer 18. The resting pressure of the support cells 26 may be between about 0.1 psig and about 2 psig, or between about 0.25 psig and about 1.0 psig. In a specific example, the resting pressure may be about 0.5 psig. In some embodiments, the support cavities 108 may have different resting pressures than one another. Once the seating assembly 10 has an occupant or is supporting a load, the active pressure of the support cells 26 may be between about 0.5 psig and about 10 psig, or between about 1 psig and about 4 psig. The resting and active pressures of the bolster cells 102 may be less than, the same as, or greater than the resting and active pressures of the support cells 26. In an exemplary embodiment, the support layer 18 may be manufactured via blow molding to entrain the fluid within the support cavities 108, at the same time the support layer 18 is created.

Extending between the support cells 26 and between the bolster cells 102 is a support webbing 112. The support webbing 112 is integrally connected to the support cells 26 and bolster cells 102. The support webbing 112 defines a plurality of ventilation slots 116 which allow air to flow through the support layer 18 to the comfort layer 34 such that the support layer 18 and the comfort layer 34 are in fluid communication with one another. The support webbing 112 may extend the entire thickness of the support cells 26 or bolster cells 102, or may only be a thin layer.

Disposed around the support layer 18 is the plurality of attachment points 30. The attachment points 30 are depicted as apertures, but may be a variety of structures configured to secure the support layer 18 to the comfort layer 34 and the seating assembly 10. In some embodiments, the attachment points 30 may be integrally defined protrusions or receptacles. Although the attachment points 30 are depicted at an edge of the support layer 18, one or more of the attachment points 30 may be positioned inward on the support layer 18 such that they are fully surrounded by at least one support cell 26 or bolster cell 102. Such an embodiment may be advantageous to prevent migration of the attachment points 30 during use or assembly which could cause a discontinuity in support along an edge of the cushion assembly 50.

Figure 4B:
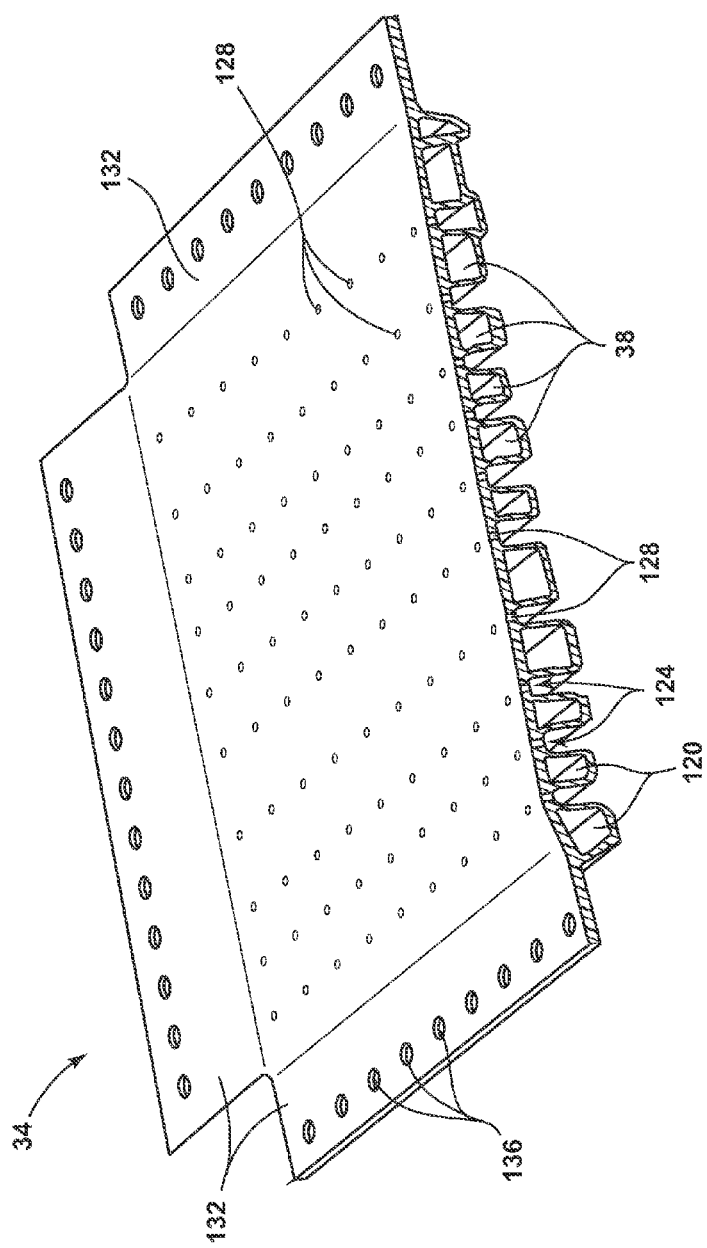
FIG. 4B is an enlarged top perspective view of a comfort layer of the cushion assembly of FIG. 3A according to one embodiment.
Figure 5A:
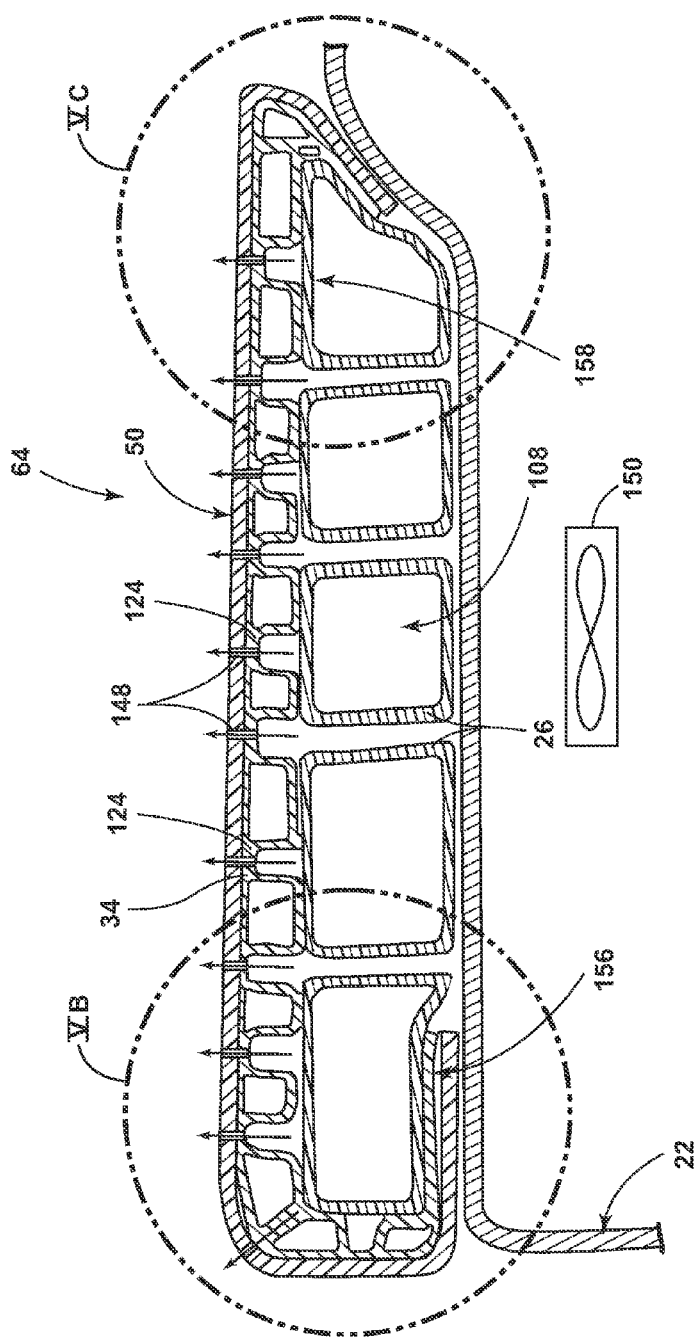
FIG. 5A is a cross-sectional view of the seating assembly taken at line V-V of FIG. 2, according to one embodiment.
Figure 5B:
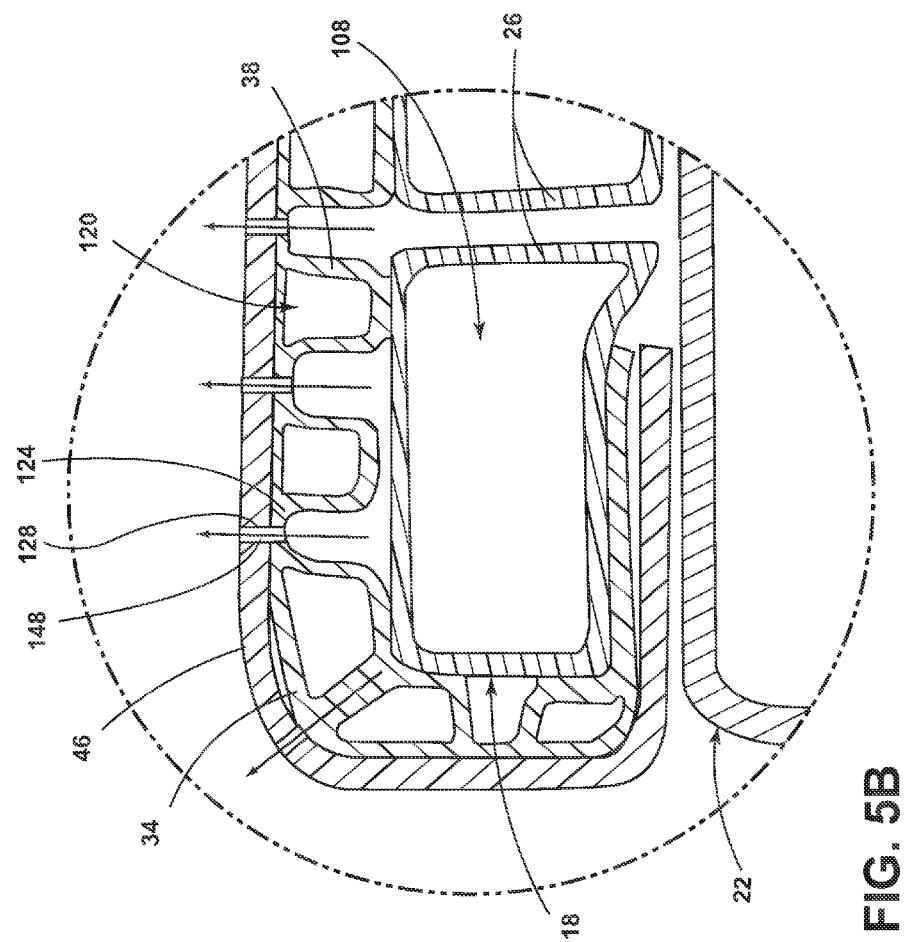
FIG. 5B is an enlarged cross-sectional view of the seating assembly of FIG. 5A taken at VB, according to one embodiment.
Figure 6:
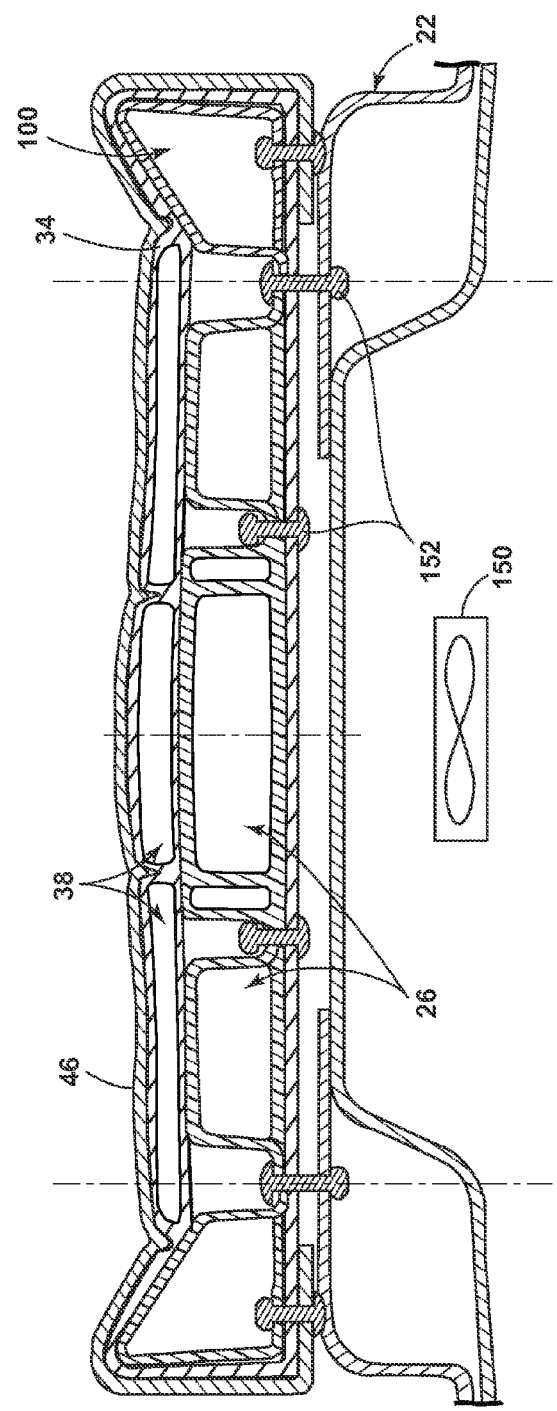
FIG. 6 is a cross-sectional view of the seating assembly taken at line VI-VI of FIG. 2, according to one embodiment.

Referring now to the depicted embodiment of FIG. 4B, the comfort layer 34 may be composed of a resilient thermoplastic which rebounds to approximately its original shape after compression and/or stretching. Exemplary resilient thermoplastics may come from classes such as styrenics, copolyesters, polyurethanes, polyamides, polyolefin blends, polyolefin plastomers, and combinations thereof. Specific examples of a resilient thermoplastic may include polyolefin elastomers, spandex, latex, polyisoprene, styrene-butadiene copolymer, acrylonitrile butadiene, rubber, choloroprene, polysiloxane, and combinations thereof. In some embodiments, the support layer 18 and the comfort layer 34 may be composed of the same, or a different, material. The comfort layer 34 may define the plurality of comfort cells 38 on an underside of the comfort layer 34. The comfort cells 38 may be about the same size as the support cells 26, or smaller. In a specific embodiment, the comfort cells may be about 30 mm by about 30 mm in size and about 25 mm thick. Smaller dimensioned comfort cells 38 may decrease the perceived "granularity" or apparent spacing between comfort cells 38 experienced by an occupant of the seating assembly 10, thereby increasing the perceived comfort of the comfort layer 34 and the cushion assembly 50.

Similarly to that of the support cells 26, the comfort cells 38 define comfort cavities 120 inside of the comfort cells 38. The comfort cavities 120 are filled with a fluid (e.g., liquid or gas) and are sealed from each other. In gas embodiments of the fluid, the gas may be oxygen, nitrogen, carbon dioxide, noble gases (e.g., helium, argon, etc.), mixtures of gases, other gases, and combinations thereof. In an exemplary embodiment, the fluid of the comfort cavities 120 may be air. The fluid of the comfort cavities 120 may have a resting pressure (e.g., a second pressure) and an active pressure similar to that of the support cells 26. The resting pressure of the comfort cells 38 may range from about 0.1 psig to about 2.0 psig, or from about 0.25 psig to about 0.75 psig. In a specific embodiment, the resting pressure is about 0.5 psig. The active pressure of the comfort layer 34 may be between about 0.5 psig and about 10.0 psig, or between about 1 psig and about 5 psig. In various embodiments, the comfort cells 38 are configured to have a lower resting pressure and/or lower active pressure than the support cells 26. In some embodiments, the comfort cavities 120 may have different resting pressures than one another. The lower pressure of the comfort cells 38, in conjunction with the resilient material the comfort layer 34 is composed of, may provide a soft and luxurious feeling to the cushion assembly 50.

Extending between the comfort cells 38 is a comfort webbing 124, similar in construction to that of the support webbing 112. Disposed through the comfort webbing 124 and between the comfort cells 38 are a plurality of ventilation apertures 128. The ventilation apertures 128 allow air to pass from the support layer 18, through the comfort layer 34, and to the cover stock 46 such that the comfort layer 34, the cover stock 46 and the support layer 18 are all in fluid communication with one another. The ventilation apertures 128 may be configured to align with the ventilation slots 116 of the support layer 18, or may be randomly dispersed in the comfort webbing 124. The comfort webbing 124 may be in physical contact with the cover stock 46. Disposed around the comfort layer 34 are flaps 132 defining a plurality of attachment holes 136. The flaps 132 are sized and shaped to fold, envelop or otherwise wrap over and around the support layer 18 and align the attachment holes 136 with the attachment points 30.

Referring now to FIGS. 5A-C and 6, the cover stock 46 is shown bonded to the comfort layer 34 and defining a plurality of ventilation holes 148 which allow air to pass through the cushion assembly 50, such that the seat bottom 64 provides ventilation to an occupant of the seating assembly 10. The ventilation holes 148 may be punctures or holes in cover stock 46 materials such as vinyl or leather, while the ventilation holes 148 in cloth embodiments of the cover stock 46 may simply be spacing between threads of the cloth. In order to move air through the cushion assembly 50, a fan 150 may be disposed proximate the support layer 18 (e.g., under the seat bottom 64 or in the seatback 14). The fan 150 may push or pull air though the cushion assembly 50 to provide a warming or cooling effect to the occupant. In some embodiments, the seat frame 22, or a back panel of the seatback 14, may define openings for air to enter and/or exit the seating assembly 10.

As depicted, the comfort layer 34 and the cover stock 46 are configured to wrap around the support layer 18 such that the support layer 18 is not visible. In the depicted embodiment, the flaps 132 of the comfort layer 34 and the cover stock 46 are positioned between the seat frame 22 and the support layer 18 proximate a forward portion 156 of the support layer 18 and a rearward portion 158 of the support layer 18. The cover stock 46 and the flaps 132 of the comfort layer 34 may also be positioned between the support layer 18 and the seat frame 22 along sides of the support layer 18.

Referring now to FIGS. 7A-8B, an exemplary assembly method of the cushion assembly 50 for seat bottom 64 embodiments is depicted. During assembly of the cushion assembly 50 to the seating assembly 10, the support layer 18 is positioned on the seat frame 22 to align the attachment points 30 of the support layer 18 with fastening points 164 defined by the seat frame 22. The comfort layer 34 and/or the cover stock 46 is then wrapped downward over the support layer 18 and positioned between the support layer 18 and the seat frame 22. The attachment holes 136 of the comfort layer 34 are then aligned with the attachment points 30 of the support layer 18 and the fastening points 164 of the seat frame 22. The cover stock 46 may optionally define openings 172 which are aligned with the attachment holes 136 of the comfort layer 34. Once the openings 172, attachment holes 136, attachment points 30, and fastening points 164 are aligned, the fastener 152 may be slid through to secure the cushion assembly 50 in place. It will be understood that at various points, the fasteners 152 may only connect the cushion assembly 50 together, and not the cushion assembly 50 to the seat frame 22. The fastener 152 may be a snap pin, a screw, a bolt, a lag bolt, a toggle pin, cotter pin, staples, or other known fasteners in the art. In other embodiments, the fastener 152 may be replaced with other joining technologies such as adhesives, thermal or mechanical joining or friction fits. Additionally or alternatively, one or more of the openings 172, attachment holes 136, attachment points 30, and fastening points 164 may not be defined such that the fastener 152 must pierce the cover stock 46, support layer 18, and/or comfort layer 34 to secure a fit. Use of the cushion assembly 50, the openings 172, attachment holes 136, attachment points 30, and fastening points 164 may allow easy "line side" assembly of the cushion assembly 50 and provide for easy installation of the cushion assembly 50 to the seating assembly 10.

Figure 7B:
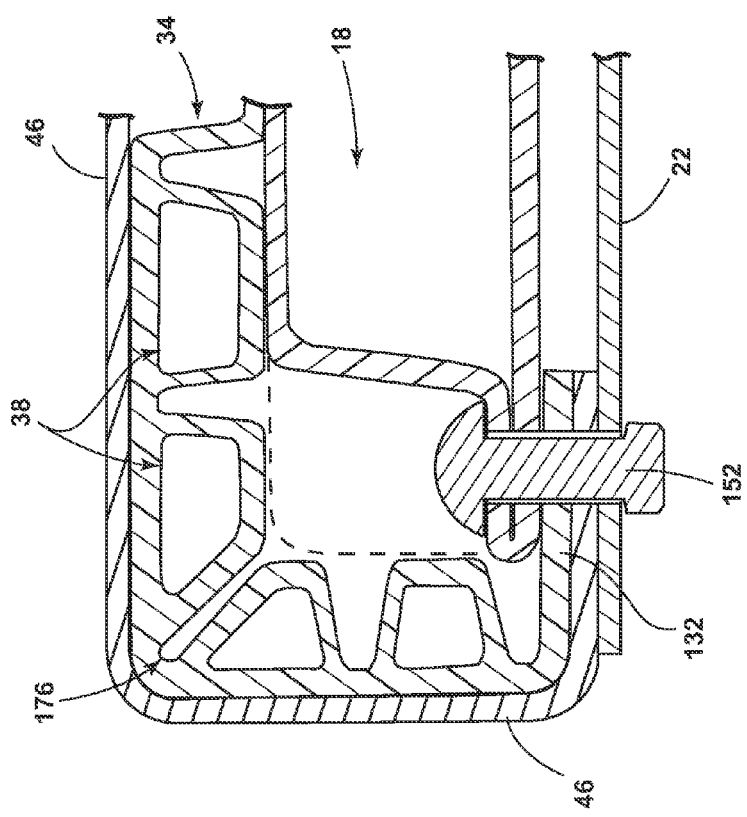
FIG. 7B is an assembled cross-sectional view taken at VB of FIG. 5A, according to one embodiment.

Referring now to FIGS. 7A and 7B, the comfort cells 38 may have a variety of cross-sectional shapes configured to allow the comfort layer 34 to wrap over the forward portion 156 of the support layer 18. In the depicted embodiment, a forward bend point 176 is flanked by comfort cells 38. The comfort cells 38 proximate the forward bend point 176 are each angled to allow the comfort layer 34 and cover stock 46 to make an approximately 90° bend. In the depicted embodiment, each of the comfort cells 38 proximate the forward bend point 176 has about a 45° wall, but it will be understood that a variety of complimentary angles may be employed (e.g., 30° and 60°, 40° and 50°) to achieve a desired bend in the comfort layer 34 and cover stock 46.

Figure 8A:
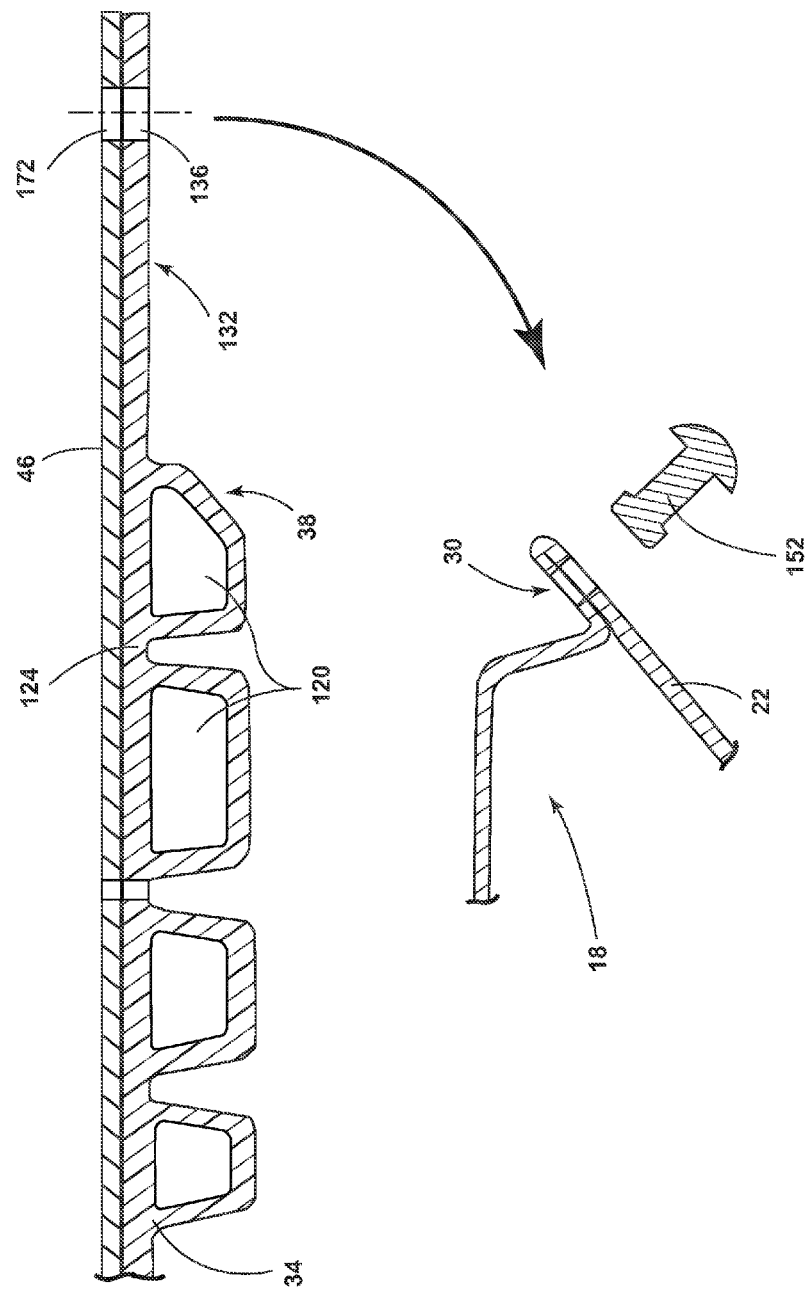
FIG. 8A is an exploded cross-sectional view taken at VC of FIG. 5A, according to one embodiment.
Figure 8B:
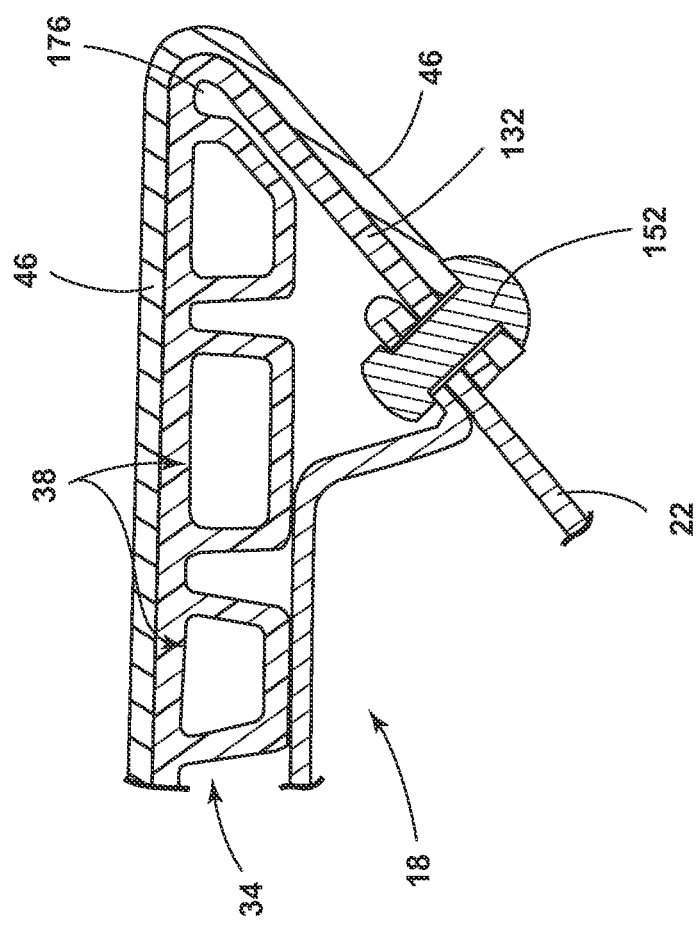
FIG. 8B is an assembled cross-sectional view taken at VC of FIG. 5A, according to one embodiment.

Referring now to FIGS. 8A and 8B, similar to the forward bend point 176, the comfort layer 34 defines a rear bend point 180 proximate one of the flaps 132 of the comfort layer 34. The comfort cells 38 proximate the rear bend point 180 may have a cross-sectional shape configured to allow the comfort layer 34 to wrap over the rear portion 158 of the support layer 18. The comfort cells 38 proximate the rear bend point 180 may be angled to allow one of the flaps 132 of the comfort layer 34 and cover stock 46 to make a greater than 90° bend. In the depicted embodiment, the comfort cells 38 proximate the rear bend point 180 have about a 45° wall and are in contact with the flap 132 of the comfort layer 34 in an assembled configuration. It will be understood that the angle of the comfort cells 38 proximate the rear bend point 180 may range from between about 0° to about 70°.

Figure 9:
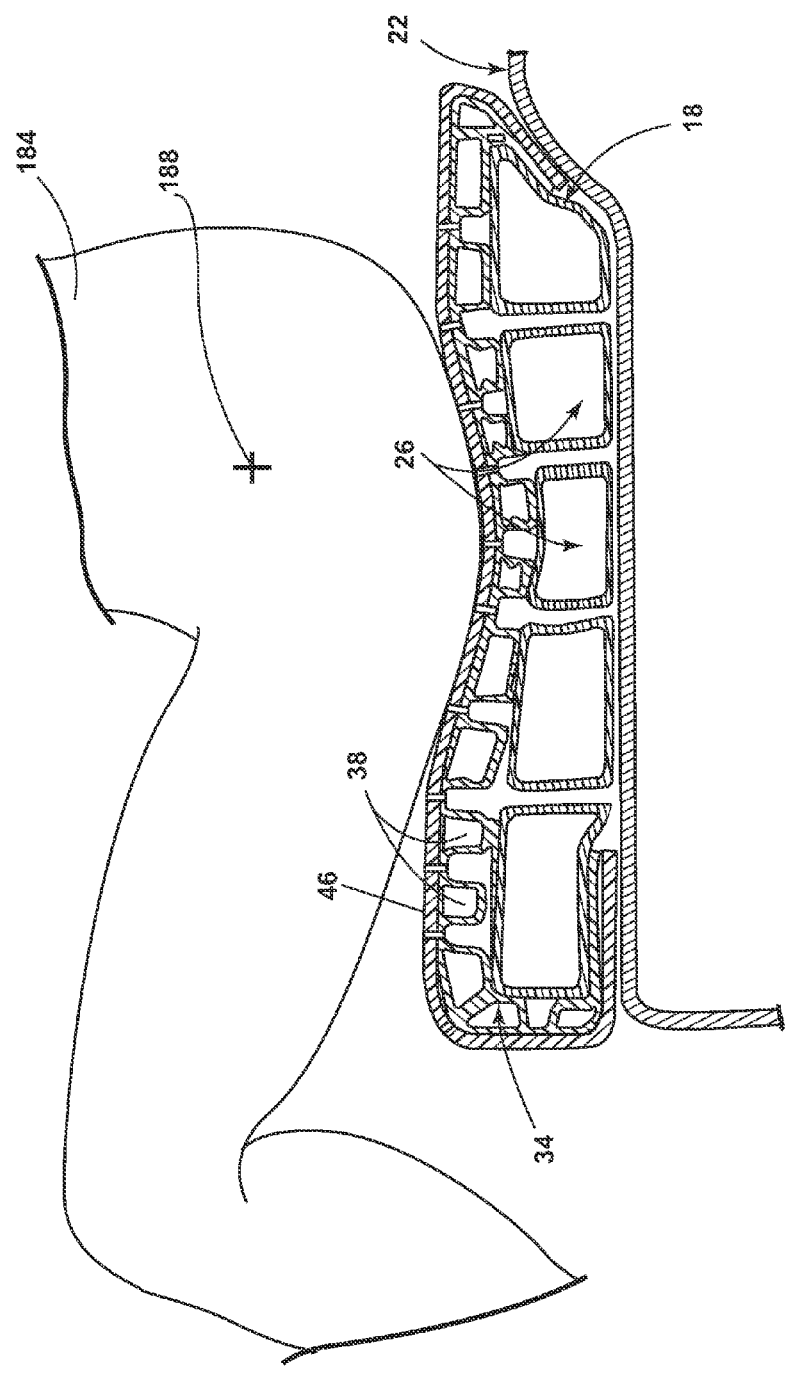
FIG. 9 is a cross-sectional view of the seating assembly supporting an occupant.

Referring now to FIG. 9, when a passenger 184 is positioned within the seating assembly 10, the comfort layer 34 and the support layer 18 of the cushion assembly 50 are configured to compress to accommodate the weight of the passenger 184. As depicted, the comfort layer 34 may compress more than the support layer 18 in embodiments where the resting pressure of the comfort cells 38 is lower than the resting pressure of the support cells 26. In various embodiments, the resting and active pressures of the support cells 26 and the comfort cells 38 are chosen to align an H-point 188 of the passenger 184 properly within the seating assembly 10. The H-point 188 of the passenger 184 in vehicle design is the theoretical, relative location of an occupant's hip, specifically the pivot point between the torso and upper leg portions of the body. The H-point 188 can be measured relative to other features (e.g., H-point 188 to the floor 68 or H-point 188 to pavement). The H-point 188 may be measured as the hip joint of a 50th percentile male passenger 184, viewed laterally, and is relevant to national and international vehicle design standards, such as global technical regulations. By individually controlling the resting and active pressures of the comfort cells 38 and support cells 26, the passenger 184 may be positioned to achieve proper placement of the H-point 188 with greater ease than with conventional foam cushions. Additionally, use of the comfort cells 38 and support cells 26 may prevent sagging of the cushion assembly 50 over time, as foam cushions may do, and therefore offers the ability to maintain proper alignment of the H-point 188 over the life of the seating assembly 10. In embodiments of the seatback 14 incorporating the cushion assembly 50, the comfort cells 38 and support cells 26 may be used to properly align a torso of the passenger 184 within the seating assembly 10.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components, electrical or mechanical, and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims unless these claims, by their language, expressly state otherwise.

What is claimed is:

1. A vehicle seating assembly, comprising:
   a seatback;
   a support layer coupled to a seat frame, the support layer comprising a plurality of permanently closed support cells and defining a plurality of attachment points, wherein the support cells have a first air pressure;
   a comfort layer positioned over the support layer, the comfort layer comprising a plurality of permanently closed comfort cells having a second air pressure; and
   a cover stock positioned over the comfort layer, wherein the support layer, comfort layer, and cover stock are secured to the seat frame via the attachment points.

2. The vehicle seating assembly of claim 1, wherein the support cells are connected via a support webbing and the comfort cells are connected via a comfort webbing, the comfort webbing in physical contact with the cover stock.

3. The vehicle seating assembly of claim 2, wherein the support webbing defines a plurality of ventilation slots between the support cells and the comfort webbing defines a plurality of ventilation apertures between the comfort cells.

4. The vehicle seating assembly of claim 3, wherein the ventilation slots and the ventilation apertures are in fluid communication with the cover stock.

5. The vehicle seating assembly of claim 1, wherein the first air pressure is greater than the second air pressure.

6. The vehicle seating assembly of claim 1, wherein at least one of the plurality of support cells and the plurality of comfort cells are in a grid arrangement.

7. The vehicle seating assembly of claim 1, wherein the support layer and the comfort layer are each positioned within the seatback.

8. A seating assembly, comprising:
   a seatback;
   a support layer coupled to a seat frame, the support layer comprising a plurality of support cells, wherein the support cells have a first air pressure; and
   a comfort layer positioned on top of the support layer, the comfort layer comprising a plurality of comfort cells having a second air pressure,
   wherein at least two comfort cells couple to bend the comfort layer around the support layers.

9. The seating assembly of claim 8, wherein the support cells are connected via a support webbing and the comfort cells are connected via a comfort webbing, the comfort webbing in physical contact with a cover stock.

10. The seating assembly of claim 8, wherein the support layer and the comfort layer are positioned within a seat bottom of the seating assembly.

11. The seating assembly of claim 8, wherein the support layer and the comfort layer are positioned within the seatback of the seating assembly.

12. The seating assembly of claim 11, wherein the comfort layer wraps over at least a portion of the support layer.

13. The seating assembly of claim 8, wherein the support layer defines a plurality of ventilation slots in fluid communication with a cover stock.

14. A vehicle cushion assembly, comprising:
    a support layer coupled to a seat frame comprising a dosed support cell and defining a ventilation slot; and
    a comfort layer positioned on top of the support layer, the comfort layer comprising a comfort cell and defining a ventilation aperture,
    wherein the ventilation slot and aperture are in fluid communication with a cover stock and the comfort layer wraps over a top and a side surface of the support layer.

15. The vehicle cushion assembly of claim 14, wherein the support layer includes a support webbing and the comfort layer has a comfort webbing, the comfort webbing in physical contact with the cover stock.

16. The vehicle cushion assembly of claim 14, wherein the support cell has a higher resting air pressure than the comfort cell.

17. The vehicle cushion assembly of claim 14, wherein the cushion assembly is coupled to a seatback of a vehicle seating assembly.

18. The vehicle cushion assembly of claim 17, wherein the cushion assembly defines a seat bottom of a vehicle seating assembly.

19. The vehicle cushion assembly of claim 14, wherein the comfort layer wraps over at least a rear portion of the support layer.

20. The vehicle cushion assembly of claim 14, wherein the comfort layer defines side bolster cells for a vehicle seating assembly.

* * * * *

UNITED STATES PATENT AND TRADEMARK OFFICE
CERTIFICATE OF CORRECTION

PATENT NO. : 9,688,174 B2  Page 1 of 1
APPLICATION NO. : 14/820883
DATED : June 27, 2017
INVENTOR(S) : Dry et al.

It is certified that error appears in the above-identified patent and that said Letters Patent is hereby corrected as shown below:

In the Claims

Column 10:

Claim 8, Line 18:
"layers" should be --layer--.

Claim 14, Line 35:
Delete "dosed".

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*